J. SPREYER, Sr.
Fifth-Wheel for Vehicles.
No. 217,826. Patented July 22, 1879.
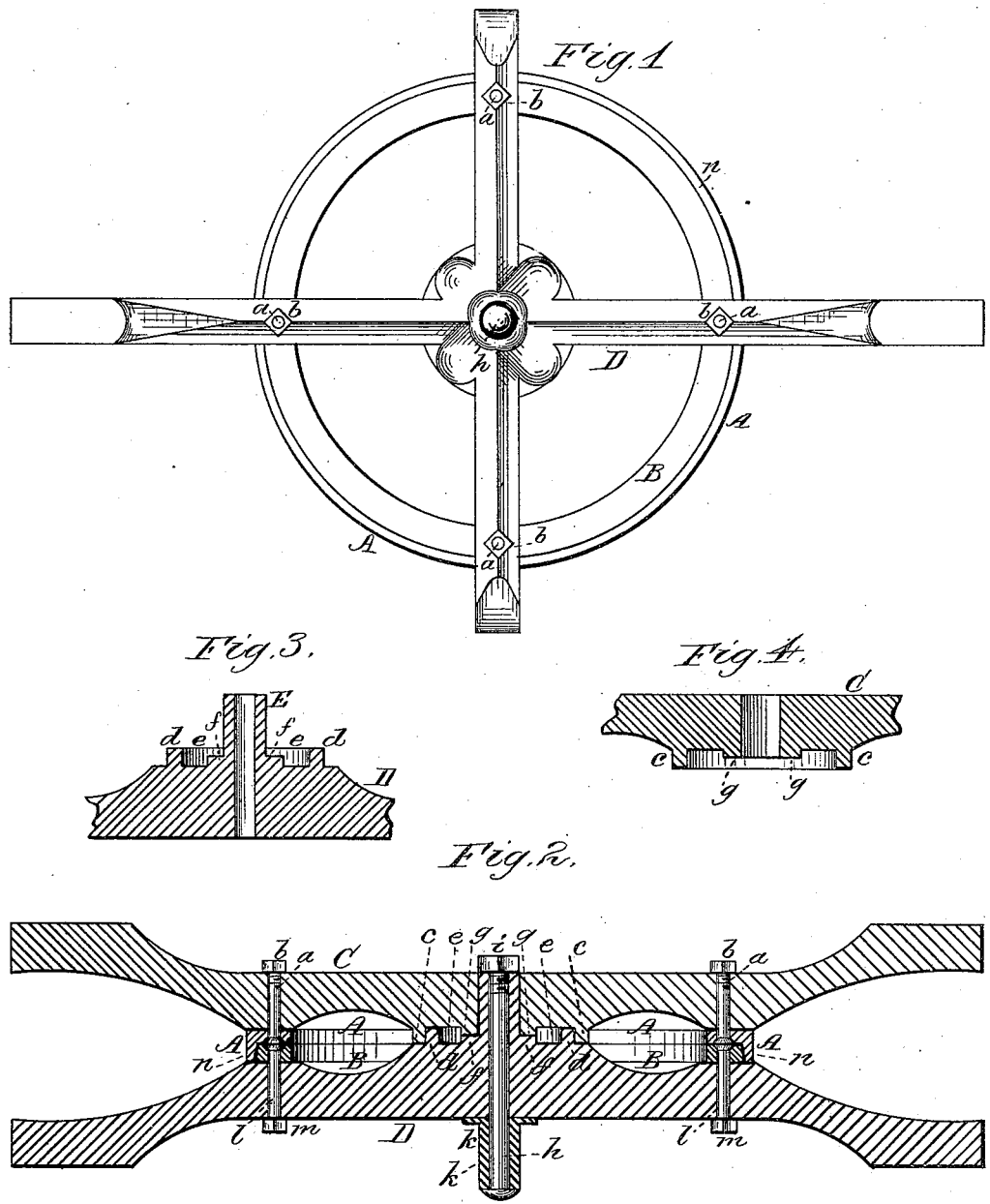

UNITED STATES PATENT OFFICE.

JACOB SPREYER, SR., OF SOUTH BEND, INDIANA.

IMPROVEMENT IN FIFTH-WHEELS FOR VEHICLES.

Specification forming part of Letters Patent No. 217,826, dated July 22, 1879; application filed June 20, 1879.

*To all whom it may concern:*

Be it known that I, JACOB SPREYER, Sr., of South Bend, in the county of St. Joseph and State of Indiana, have invented a new and valuable Improvement in Fifth-Wheels; and I do hereby declare that the following is a full, clear, and exact description of the construction and operation of the same, reference being had to the annexed drawings, making a part of this specification, and to the letters and figures of reference marked thereon.

Figure 1 of the drawings is a representation of an under-side-plan view of my invention. Fig. 2 is a vertical section; and Figs. 3 and 4, detail views in section.

This invention has relation to fifth-wheels for wagons, carriages, and other vehicles; and consists in the novel construction and combination of parts, as will be hereinafter described, and subsequently pointed out in the claims.

In the accompanying drawings, A B represent the upper and lower sections of the fifth-wheel. The upper half or section has secured to it by suitable bolts and nuts $a\ b$ a bolster, C, formed near its axial center with a circumferential flange, $c$, which fits over and around the exterior sides of a shoulder, $d$, also of circular form. The shoulder $d$ is cast or otherwise formed upon the cross-piece or bed D, and a space of annular form, as shown at $e$, is left between the shoulder and seat $f$, the bolster C having a bearing, $g$, around a central opening formed in the bolster, which rests upon the seat $f$.

The space or chamber $e$ forms a receptacle for the lubricating oil or grease, to insure the perfect operation of the wheel, the bearing $g$, and seat $f$. The flange $c$ and shoulder $d$ serve to give additional security against the lateral displacement of the parts, making a firm connection of the sections A B.

The cross-piece or bed D is cast with an annular sleeve, E, over which fits the central portion of the bolster C, secured thereto by a screw-rod, $h$, passing up through the sleeve and held by a nut, $i$. The lower end of the rod $h$ is headed, and has between it and the under side of the bed D a washer, $k$.

The lower half or section, B, of the fifth-wheel is secured to the bed D by bolts and nuts $l\ m$, and the section is slightly beveled upon its outer periphery to correspond with the bevel upon the flange $n$ of the upper half or section, A, which fits snugly against the beveled side or periphery of the section B. This bevel, both upon the upper and lower sections, A B, allows the dirt or sand to work out from between them, and admits of a more perfect running of the wheel. The rod or king-bolt $h$ is protected and prevented from rapid wear by the sleeve E, and the peculiar construction of the several parts prevents any unnecessary friction or rapid wearing.

Having now fully described my invention, what I claim as new, and desire to secure by Letters Patent, is—

1. The bed D, having shoulder $d$, recess or chamber $e$, seat $f$, and section B, in combination with bolster C and section A, said bolster having flange $c$ and bearing $g$, substantially as and for the purpose set forth.

2. The bed D, having sleeve E, and section B, with bevel upon its side or outer periphery, in combination with the bolster C and section A, with bevel-flange $n$, and the rod or king-bolt $h$, substantially as and for the purpose specified.

In testimony that I claim the above I have hereunto subscribed my name in the presence of two witnesses.

JACOB SPREYER, SR.

Witnesses:
JOHN WAGENER,
EDWARD JAMOTT.